(12) United States Patent
Panwar

(10) Patent No.: US 9,661,051 B2
(45) Date of Patent: May 23, 2017

(54) STREAMLOADING CONTENT, SUCH AS VIDEO CONTENT FOR EXAMPLE, BY BOTH DOWNLOADING ENHANCEMENT LAYERS OF THE CONTENT AND STREAMING A BASE LAYER OF THE CONTENT

(71) Applicant: Shivendra Panwar, Freehold, NJ (US)

(72) Inventor: Shivendra Panwar, Freehold, NJ (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 14/867,503

(22) Filed: Sep. 28, 2015

(65) Prior Publication Data

US 2016/0021165 A1    Jan. 21, 2016

Related U.S. Application Data

(63) Continuation of application No. 13/936,156, filed on Jul. 6, 2013, now Pat. No. 9,172,737.

(60) Provisional application No. 61/677,044, filed on Jul. 30, 2012.

(51) Int. Cl.
*H04L 29/06* (2006.01)
*H04L 29/08* (2006.01)
*H04W 84/04* (2009.01)

(52) U.S. Cl.
CPC ........ *H04L 65/607* (2013.01); *H04L 65/4084* (2013.01); *H04L 65/604* (2013.01); *H04L 65/80* (2013.01); *H04L 67/02* (2013.01); *H04L 67/2842* (2013.01); *H04L 69/02* (2013.01); *H04L 67/42* (2013.01); *H04W 84/042* (2013.01)

(58) Field of Classification Search
CPC ..................................................... H04L 65/607
See application file for complete search history.

(56) References Cited

U.S. PATENT DOCUMENTS

| | | | | |
|---|---|---|---|---|
| 6,392,705 B1 * | 5/2002 | Chaddha | ................... | G06T 9/40 348/388.1 |
| 6,496,980 B1 * | 12/2002 | Tillman | ............. | H04N 7/17318 348/E7.071 |
| 6,925,120 B2 * | 8/2005 | Zhang | .............. | H04N 21/23432 375/240.08 |

(Continued)

OTHER PUBLICATIONS

Merriam-Webster, "processor", 2014.*

(Continued)

*Primary Examiner* — O. C. Vostal
(74) *Attorney, Agent, or Firm* — John C. Pokotylo; Straub & Pokotylo

(57) ABSTRACT

Video streaming applications are a major contributor to the recent dramatic rise of data traffic in cellular networks. Mobile users in a cellular network often experience fluctuating data rates, which might affect the quality of video they view in a streaming service. Although replacing such video streaming services with video downloading/renting services could potentially allow such mobile users to enjoy consistently higher quality videos, such services typically cost a lot more than video streaming services because of legal copyright pricing and management issues. By downloading enhancement layers but streaming base layers of the content, mobile users can enjoy download-quality videos with a service (legally) classified as a streaming service.

14 Claims, 5 Drawing Sheets

(56) References Cited

U.S. PATENT DOCUMENTS

| | | | | |
|---|---|---|---|---|
| 7,844,992 | B2* | 11/2010 | Boyce | H04N 21/23439 |
| | | | | 725/91 |
| 8,422,551 | B2* | 4/2013 | Park | H04N 19/56 |
| | | | | 375/240.01 |
| 2005/0060386 | A1* | 3/2005 | Seo | H04N 21/23432 |
| | | | | 709/219 |
| 2005/0193138 | A1* | 9/2005 | Kim | H04L 29/06027 |
| | | | | 709/203 |
| 2006/0023748 | A1* | 2/2006 | Chandhok | H04L 29/06027 |
| | | | | 370/469 |
| 2007/0183494 | A1* | 8/2007 | Hannuksela | H04N 21/234327 |
| | | | | 375/240.1 |
| 2007/0223575 | A1* | 9/2007 | Wang | H04N 19/70 |
| | | | | 375/240.1 |
| 2009/0187960 | A1* | 7/2009 | Lee | H04N 7/17318 |
| | | | | 725/131 |
| 2010/0157016 | A1* | 6/2010 | Sylvain | H04N 7/15 |
| | | | | 348/14.08 |
| 2010/0275229 | A1* | 10/2010 | Civanlar | G11B 27/105 |
| | | | | 725/39 |
| 2011/0078722 | A1* | 3/2011 | Wendling | H04N 7/163 |
| | | | | 725/31 |
| 2012/0023155 | A1* | 1/2012 | Myers | H04N 21/23432 |
| | | | | 709/203 |
| 2013/0159384 | A1* | 6/2013 | Funge | H04L 47/27 |
| | | | | 709/203 |
| 2013/0215219 | A1* | 8/2013 | Hefeeda | H04L 65/4076 |
| | | | | 348/42 |

OTHER PUBLICATIONS

Cote et al., "H.263+: Video Coding at Low Bit Rates", 1998.*
Cui, "Layered Peer-to-Peer Streaming", 2003.*
Fehn et al., "An Evolutionary and Optimsed Approach on 3D-TV", 2002.*
Gallant et al., "Rate-Distortion Optimzed Layered Coding with Unequal Error Protection for Robust Internet Video", 2001.*
Goff et al., "Freeze-TCP: A true end-to-end TCP enhancement mechanism for mobile environments", 2000.*
Hu et al., "Scalable Video Multicast in Cognitive Radio Networks", 2010.*
Li et al., "Layered Video Multicast with Retransmission (LVMR): Evaluation of Error Recovery Schemes", 1997.*
Rejaie et al., "Multimedia Proxy Caching Mechanism for Quality Adaptive Streaming Applications in the Interent", 2000.*
Schwarz et al., "SNR-Scalable Extension of H.264/AVC", 2004.*
Vickers et al., "Source-Adaptive Multilayered Multicast Algorithms for Real-Time Video Distribution", 2000.*

* cited by examiner

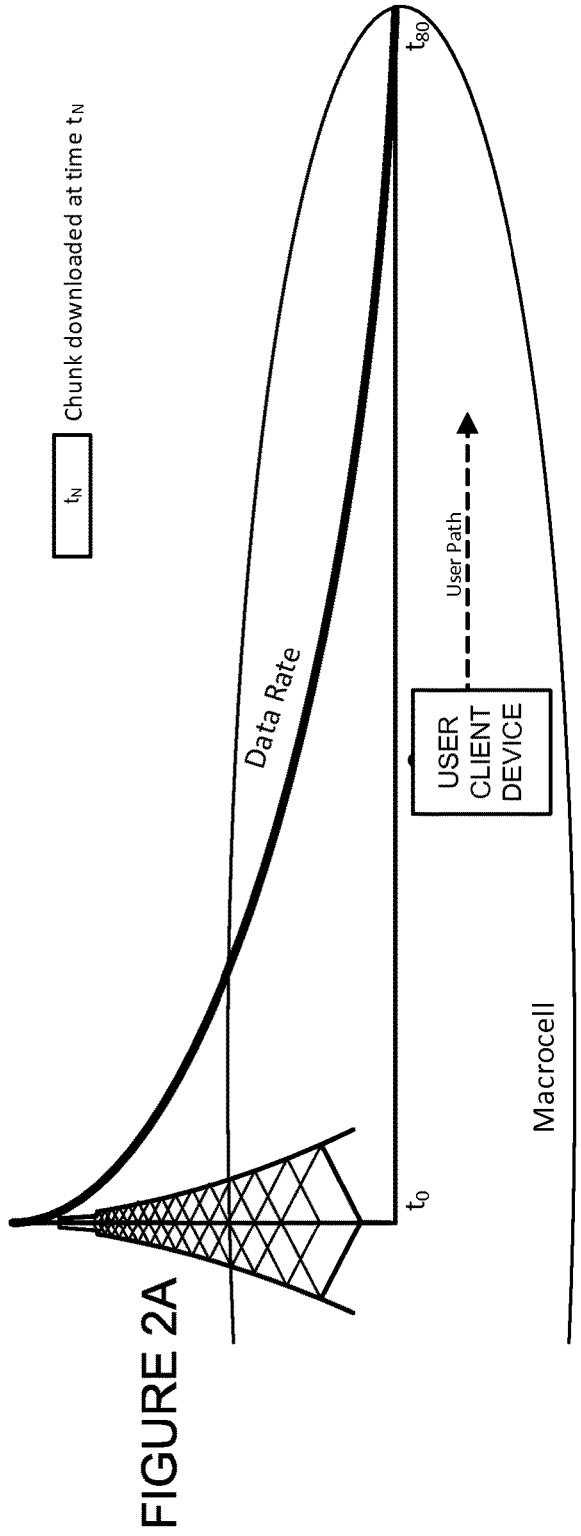
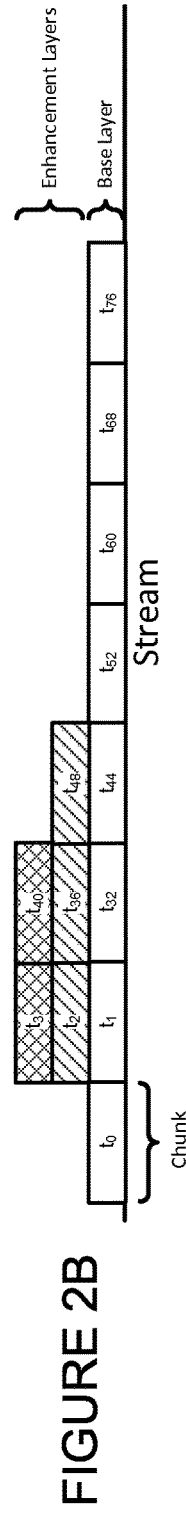
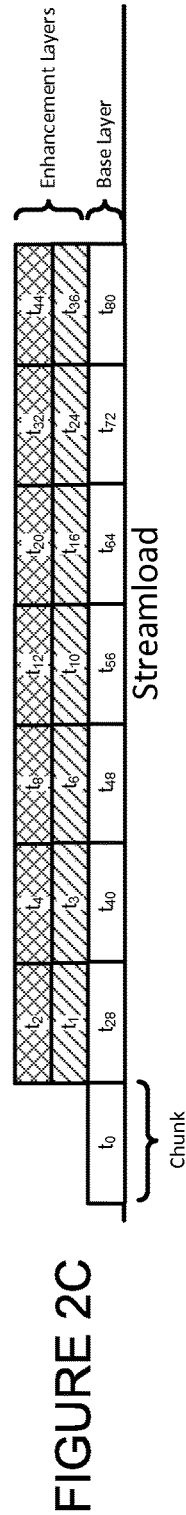
FIGURE 2A
FIGURE 2B
FIGURE 2C

STREAMLOADING CONTENT, SUCH AS VIDEO CONTENT FOR EXAMPLE, BY BOTH DOWNLOADING ENHANCEMENT LAYERS OF THE CONTENT AND STREAMING A BASE LAYER OF THE CONTENT

§0.2 RELATED APPLICATIONS

This application is a continuation of U.S. patent application Ser. No. 13/936,156 (referred to as "the '156 application" and incorporated herein by reference), titled "STREAMLOADING CONTENT, SUCH AS VIDEO CONTENT FOR EXAMPLE, BY BOTH DOWNLOADING ENHANCEMENT LAYERS OF THE CONTENT AND STREAMING A BASE LAYER OF THE CONTENT," filed on Jul. 6, 2013 and listing Shivendra Panwar as the inventor, the '156 application claiming benefit to U.S. Provisional Application Ser. No. 61/677,044 titled "STREAMLOADING: A NEW WAY TO STREAM CONTENT TO USERS WITH LIMITED OR EXPENSIVE BANDWIDTH ACCESS," filed on Jul. 30, 2012, and listing Shivendra Panwar as the inventor (referred to as "the '044 provisional" and incorporated herein by reference). The scope of the present invention is not limited to any requirements of the specific embodiments described in that application.

§0.1 FEDERAL FUNDING

This invention was made with Government support and the Government may have certain rights in the invention as provided for by Grants 1230773 and 0905446 by the National Science Foundation.

§1. BACKGROUND OF THE INVENTION 1.1. Field of the Invention

The present invention concerns playing media content provided from a remote source.

1.2. Background Information

Modern cellular networks are evolving rapidly. Over the past few years, with the advent of smart mobile devices, a huge increase of data consuming applications, and a manifold increase in the capacity of cellular network bandwidth, users in cellular networks have become extremely data hungry. Cisco predicts cellular data traffic will grow by over eight times in the next four years, with more than two-thirds of it consisting of mobile video. (See, e.g., the article, Cisco, "Cisco Visual Networking Index: Global Mobile Data Traffic Forecast Update, 2011-2016," available at http://goo.gl/reBfY. (February 2012), incorporated herein by reference.) Traffic from next year's video alone is projected to exceed current total mobile traffic. Moreover, video streaming services are expected to constitute a major portion of the mobile video traffic. (See, e.g., the article, J. Erman, A. Gerber, K. K. Ramakrishnan, S. Sen, and O. Spatscheck, "Over The Top Video: the Gorilla in Cellular Networks," *Proceedings of the* 2011 *ACM SIGCOMM conference on Internet Measurement, IMC'*11, pages 127-136 (ACM, November 2011), incorporated herein by reference.) Indeed, video traffic has increased to the point that it now constitutes more than half of all Internet traffic. (Recall, e.g., the article, Cisco, "Cisco Visual Networking Index: Global Mobile Data Traffic Forecast Update, 2011-2016," available at http://goo.gl/reBfY. (February 2012), incorporated herein by reference.) Together, a wide range of video delivery services and a surge in the quality of videos account for this phenomenon. As more devices become mobile, demand by users for video delivered to their mobile devices is expected to increase.

The data rate available to a mobile user in a cellular network often varies. For example, a user located closer to a base station may experience a higher data rate than one who is far away, at the edge of the macrocell. Further, high data rate small cells such as picocells (deployed by the service providers), femtocells, and potentially even WiFi hotspots (deployed by users) are often overlaid on cellular networks. This results in extreme variations in data rates experienced by a mobile user in a cellular network. Yet another source of bandwidth variability are periods and/or areas of congestion in the network (e.g., during peak hours). Note that network congestion is not limited to wireless networks, and is often found in other communications networks (e.g., "wired" communications networks) as well.

In a video streaming system, the data rate available to a user affects, almost instantaneously, the quality of video experienced by the user. For example, when a user is watching a streaming video, the video quality becomes poor almost as soon as the user moves into a low data rate area. Thus, it will become increasingly important to providing good video streaming services in cellular networks in the near future.

In recent years, there have been industry proposals to exploit adaptive video streaming in wireless networks. With adaptive video streaming, the video bit rate is switched on-the-fly to provide the best video quality to the user based on the available resources in the network. For example, Microsoft's IIS Smooth Streaming (See, e.g., the reference, A. Zambelli, *Mobile Video Transmission Using Scalable Video Coding*, (Microsoft Corporation, March 2009), incorporated herein by reference.), Adobe's Flash Dynamic Streaming (See, e.g., the article, D. Hassoun, "Dynamic Streaming in Flash Media Server 3.5—Part 1: Overview of the New Capabilities," http://goo.gl/0G95h (August 2010), incorporated herein by reference.), and Apple's HTTP Adaptive Bit-rate Streaming (See, e.g., the article, R. Pantos (Ed.) and W. May, "HTTP Live Streaming," (Apple Inc., September 2012), incorporated herein by reference.) use various techniques to deliver streaming video to users efficiently by dynamically switching among different streams of varying quality and bit-rate to provide a smooth and seamless video to users.

The research community has also been very active in this area. For example, an intelligent bit-rate switching based adaptive video streaming (ISAVS) algorithm has been proposed. (See, e.g., the article, X. Qiu, H. Liu, D. Li, S. Zhang, D. Ghosal, and B. Mukherjee, "Optimizing HTTP-based Adaptive Video Streaming for Wireless Access Networks, 3rd *IEEE International Conference on Broadband Network and Multimedia Technology (IC-BNMT)*, 2010, pages 838-845 (October 2010), incorporated herein by reference.) The ISAVS algorithm provides the best possible video quality to users with minimum replay interruptions. Similarly, an optimized H.264/AVC-based bit stream switching for mobile video streaming has been proposed. (See, e.g., the article, T. Stockhammer, G. Liebl, and M. Walter, "Optimized H.264/AVC-Based Bit Stream Switching for Mobile Video Streaming," *EURASIP J. Appl. Signal Process.,* 2006: 127-127 (January 2006), incorporated herein by reference.) The advanced bit stream switching capabilities using SP/SI pictures defined in the H.264/MPEG-4 AVC standard (See, e.g., the article, T. Wiegand, G. Sullivan, G. Bjontegaard, and A. Luthra, "Overview of the H.264/AVC Video Coding Standard," *IEEE Transactions on Circuits and Systems for*

*Video Technology*, 13(7):560-576 (July 2003), incorporated herein by reference.) were exploited in the foregoing reference.

Despite resent proposals such as those referenced above, streaming of content, such as video content, still has certain inherent limitations, some of which are discussed in §1.2.1.4 below. Although playing a previously downloaded video generally avoids such problems, downloads are generally much more costly to users than streams.

§1.2.1 Traditional Video Delivery

This section discusses traditional video delivery services and introduces their drawbacks when used over modern wireless networks.

§1.2.1.1 Streaming and Downloading

There are presently two ways users can legally consume digital media content in the United States—downloads and streaming. A video streaming service is one where the consumer is not allowed to cache more than a short period of video data ahead of the point being watched. (See, e.g., the reference, "Rates and Terms for use of Musical Works under Compulsory License for Making and Distributing of Physical and Digital Phonerecords," Title 37 Patents, Trademarks, and Copyrights; Chapter III Copyright Royalty Board, Library of Congress; Subchapter E Rates and Terms for Statutory Licenses; Part 385, 37 C.F.R. §385.11 (February 2009), incorporated herein by reference, which pertains to the analogous concept of audio streaming.) More specifically, according to 37 C.F.R. §385.11, "streaming cache reproduction" means a reproduction of a sound recording of a musical work made on a computer or other receiving device by a service solely for the purpose of permitting an end user who has previously received a stream of such sound recording to play such sound recording again from local storage on such computer or other device rather than by means of a transmission; provided that the user is only able to do so while maintaining a live network connection to the service, and such reproduction is encrypted or otherwise protected consistent with prevailing industry standards to prevent it from being played in any other manner or on any device other than the computer or other device on which it was originally made. Services such as Hulu, Netflix, and Amazon Instant Video are examples of video streaming services. On the other hand, a video downloading service is one where the consumer tries to cache as much of the video as their network bandwidth allows, irrespective of the point of video being watched. Examples of video downloading services include iTunes Movie Rentals, Google Play Movies, as well as YouTube. (See, e.g., the article, C. Breen, "Where to Look for Streaming Movies and TV Shows," http://goo.gl/JlW0I (July 2012), incorporated herein by reference.) Unlike streaming services in which video playback is aborted when a device loses its connection to the network, it may play all the way to the end in a downloading service. Also, unlike a downloading service, seeking back on the video to replay a portion of it requires the data to be sent again in a streaming service.

Downloads are generally priced much higher than streaming (Recall the definition of "streaming cache reproduction.") since they confer some ownership rights, as compared with streams, which are consumable only over a limited duration while a "live connection" is maintained. For example, video downloading services are typically ten to a hundred times more expensive than video streaming services, because of the charges imposed by content owners. As a result, from the perspective of price, in most cases, users prefer a streaming service to a downloading service, especially for longer format videos that they are unlikely to view repeatedly.

On the other hand, streaming, especially for content like video, requires a high bandwidth connection (which may be expensive to the consumer and/or the communications service provider) to be maintained over the duration of its consumption. In some cases, such as in a mobile environment or in any access network that delivers variable bandwidth (e.g., DSL or cable), this bandwidth often cannot be guaranteed for the duration of consumption. Traditionally, the problem of maintaining a high bandwidth connection when streaming video has been addressed by either (a) delivering the streamed content at a relatively low bandwidth, at the cost of reducing the quality and aesthetic enjoyment of the media (e.g., low definition video instead of high definition video), or (ii) by adapting the coding rate, and consequently the quality, in real time to match the bandwidth available. Clearly, the latter option also leads to variable quality.

The challenge and expense of maintaining a high bandwidth connection is almost always higher in a mobile environment.

§1.2.1.2 Streaming in Wireless Networks

With the dramatic increase in the use of mobile devices, more users now intend to watch high quality videos on these devices using wireless network connections such as WiFi or 3G/4G/4G LTE and next generation cellular technologies. These wireless networks inherently provide variable bandwidths to users, especially for those who are mobile. Bandwidths experienced by users in these wireless networks can vary from tens of Mbps to a few Kbps, depending on traffic demand(s) from other user(s), and where the user is located with respect to a base station in case of cellular networks, or with respect to an access point in case of a WiFi hotspot. Since higher quality videos require higher data rates, if the user moves to a low data rate region, or if there is traffic congestion, there will likely be insufficient bandwidth to support the streaming of high definition video. In such scenarios, it is expected that video streaming service providers will prefer to lower the quality of the video delivered, rather than causing an interruption in its playback. As discussed, congestion in any type of communications networks (including "wired" networks) can cause similar challenges.

§1.2.1.3 Scalable Video Coding

Lowering the video quality by reducing its bit rate can also be implemented using SVC (i.e., scalable video coding), an extension of the H.264 video coding standard. SVC allows a high quality video to be decomposed into multiple bit streams, with a subset of these bit streams requiring a lower bandwidth that can be used to display a lower quality version of the original video. In other words, a video can be divided into several bit stream layers such that each additional upper layer adds to the quality of the video. Further, every layer consists of predictions based on data decoded by (e.g., typically all of) the layer(s) below it. Thus, every layer directly or indirectly depends on its lower layer(s), and can only be used when (e.g., typically all) layer(s) below it are available to be decoded. The lowest layer, referred to as the "Base Layer" of the video, can be decoded by itself, independent of any other layer. The higher layers of the video that progressively enhance its quality are referred to as "Enhancement Layers" of the video.

Given its scalability in quality and bit rate of the video, SVC is considered to be a suitable encoding method for mobile TV broadcast/multicast (See, e.g., the article, S. Hua, Y. Guo, Y. Liu, H. Liu, and S. Panwar, "Scalable Video Multicast in Hybrid 3G/Ad-Hoc Networks," *IEEE Transactions on Multimedia,* 13(2):402-413 (April 2011), incorporated herein by reference.) as well as video streaming services (See, e.g., the article, T. Schierl, T. Stockhammer, and T. Wiegand, "Mobile Video Transmission Using Scalable Video Coding," *IEEE Transactions on Circuits and Systems for Video Technology,* 17(9):1204-1217 (September 2007), incorporated herein by reference.). The video to be streamed is first divided into chunks, where each chunk contains data for a small temporal portion of the video (e.g., on the order of one second of video). In simpler terms, the video can be represented as the sequential playlist of all its temporal chunks (simply referred to as "chunks", without loss of generality). Each chunk is then divided into a base layer and one or more enhancement layers using SVC. The chunks are then streamed, in sequence, to a user device. At the user device, the chunks are decoded and played, one by one, as they become available. In general, a chunk cannot be played while it is still being downloaded. Under SVC, the user device tries to download as many layers of a chunk of video as the available bandwidth allows, until it is time to start playing the chunk. Using SVC, user devices can avoid interruptions by continuing to play the video at a lower quality when their bandwidth drops, by downloading fewer layers of the chunks of the video.

§1.2.1.4 Limitations of Streaming

Although using SVC for streaming videos over wireless networks helps to reduce interruptions to the video as the user experiences varying bandwidths, it still suffers from a few drawbacks when compared to other kinds of video delivery services. For instance, since a user device decoding and playing streaming video cannot (legally) cache (e.g., too many) future chunks of the video (even if they are close to the base station or access point, and have surplus bandwidth available), the quality of video drops as soon as such user devices move away from the base station or access point (and/or as soon as congestion occurs) and their bandwidth falls below the required level to download all layers (that is, the base layer and all enhancement layers) of the video.

On the other hand, when a use device downloads (as opposed to plays a stream of) a video, the surplus bandwidth available can be used to download future chunks of the video. Thus, with downloading, even when the available bandwidth falls, the user can continue to enjoy the same high quality video since future chunks were stored in cache. Unfortunately, however, as discussed above, downloading video content is generally much more expensive than streaming such content.

§1.2.1.5 Perceived Needs

As should be appreciated from the foregoing, although a user may prefer to use a video streaming service from the price perspective, a video downloading service may be preferable from the quality perspective. Consequently, a service that can potentially provide download quality video, while still qualifying legally as a streaming service, is highly desirable for wireless networks.

§2. SUMMARY OF THE INVENTION

Example embodiments consistent with the present invention provide a video delivery service that, while still (legally) qualifying as a streaming service (Recall, e.g., the reference, "Rates and Terms for use of Musical Works under Compulsory License for Making and Distributing of Physical and Digital Phonerecords," Title 37 Patents, Trademarks, and Copyrights; Chapter III Copyright Royalty Board, Library of Congress; Subchapter E Rates and Terms for Statutory Licenses; Part 385, 37 C.F.R. §385.11 (February 2009).), offers users video quality potentially as good as those offered by a traditional, more expensive downloading service. Such example embodiments may do so by: (a) requesting, by a client device, enhancement layers of the media content; (b) receiving, by an enhancement layer serving module, the request for enhancement layers of the media content; (c) serving, by the enhancement layer serving module, at least some enhancement layers of the media content to the client device; (d) receiving, by the client device, at least some enhancement layers of the media content; (e) storing, by the client device, the received at least some enhancement layers of the media content; (f) requesting, by the client device, a base layer of the media content; (g) receiving, by a base layer streaming module, the request for a base layer of the media content; (h) streaming, by the base layer streaming module, the base layer of the media content to the client device; (i) receiving, by the client device, the stream of the base layer of the media content; (j) decoding, by the client device, the media content using both (1) the stored at least some enhancement layers of the media content and (2) the received stream of the base layer of the media content; and (k) playing, by the client device, the decoded media content.

Some example embodiments consistent with the present invention use an extension of the H.264 video coding standard, called Scalable Video Coding (or "SVC") (See, e.g., the article, H. Schwarz, D. Marpe, and T. Wiegand, "Overview of the Scalable Video Coding Extension of the H.264/AVC Standard," *Circuits and Systems for Video Technology, IEEE Transactions on,* 17(9):1103-1120 (September 2007), incorporated herein by reference.), to encode video content into multiple scalable layers, the lowest layer being the base layer, while the higher layer(s) being enhancement layer(s). More specifically, an example streamloading system consistent with the present invention allows users to download enhancement layers, while actually streaming only the base layer of the video. Since the enhancement layers cannot be decoded without the base layer, the example streamloading service (legally) qualifies as a streaming service (the key legal feature of streaming as opposed to downloading being the continuous connection between the server and the user while video content is being viewed. (Recall, e.g., the reference, "Rates and Terms for use of Musical Works under Compulsory License for Making and Distributing of Physical and Digital Phonerecords," Title 37 Patents, Trademarks, and Copyrights; Chapter III Copyright Royalty Board, Library of Congress; Subchapter E Rates and Terms for Statutory Licenses; Part 385, 37 C.F.R. §385.11 (February 2009).)

§3. BRIEF DESCRIPTION OF THE DRAWINGS

FIG. 1 illustrates an example of data flow in a streamloading system consistent with the present invention.

FIGS. 2A-2C compare streaming and streamloading when a user device moves from a high data rate center of cell to a low data rate cell edge.

FIG. 3 includes flow diagrams illustrating example methods consistent with the present invention performed by a user device that can request and decode (and perhaps play) digital content, an enhancement layer server, and a base layer server (which may be the same device as, or a different device from, the enhancement layer server).

§4. DETAILED DESCRIPTION

Figure 1:
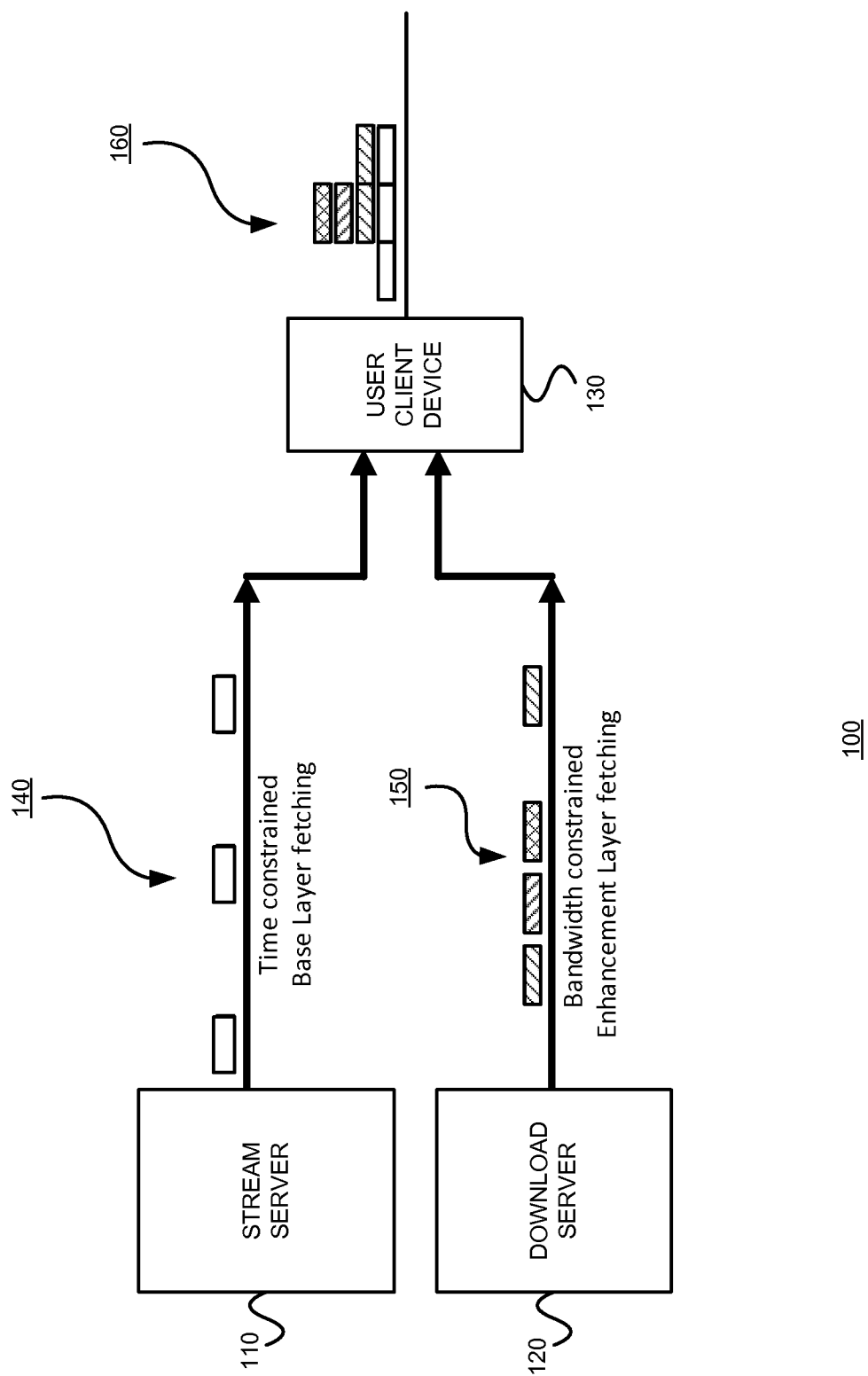

Example embodiments consistent with the present invention may involve novel methods, apparatus, message formats, and/or data structures for encoding, streaming, decoding and/or playing content such as video content. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, certain terms are defined in §4.1. Then, an overview of an example implementation consistent with the present invention is provided in §4.2. Thereafter, a detailed example implementation consistent with the present invention is described in §4.3. Next, example apparatus consistent with the present invention are described in §4.4. Simulated performance of one example implementation is discussed in §4.5. Alternatives and refinements to some of the example embodiments are described in §4.6. Finally, some conclusions are presented in §4.7.

§4.1 DEFINITIONS

As used in this application, a "content streaming service" is one in which a consumer device is not allowed to cache more than a short period (and/or small amount) of content data ahead of the point being played (e.g., watched in the case of a video streaming service). (Recall, e.g., "Rates and Terms for use of Musical Works under Compulsory License for Making and Distributing of Physical and Digital Phonerecords," Title 37 Patents, Trademarks, and Copyrights; Chapter III Copyright Royalty Board, Library of Congress; Subchapter E Rates and Terms for Statutory Licenses; Part 385, 37 C.F.R. §385.11 (February 2009).) Services such as Hulu, Netflix, and Amazon Instant Video are examples of video streaming services. (Recall, e.g., C. Breen, "Where to Look for Streaming Movies and TV Shows," http://goo.gl/J1W0I (July 2012).) Content playback is aborted when a device loses its connection to the network in a content streaming service. Unlike a downloading service, seeking back to replay a portion of the content requires the previously played content data to be sent again in a streaming service.

As used in this application, a "content downloading service" is one in which the consumer device tries to cache as much of the video as their network bandwidth allows, irrespective of the point of video being played (e.g., watched in the case of a video download service). Services such as iTunes Movie Rentals, Google Play Movies, etc., are examples of video downloading services. (Recall, e.g., C. Breen, "Where to Look for Streaming Movies and TV Shows," http://goo.gl/J1W0I (July 2012).) Once downloaded, a network connection is not needed to play previously downloaded content, and is not needed to perform a seek operation on the content.

As used in this application, the "base layer" of an encoded media content can be decoded, independent of any higher level layers, to provide a (relatively) low quality version of the media content.

As used in this application, the "enhancement layer(s)" of an encoded media content cannot be decoded without the corresponding base layer. A given enhancement layer directly or indirectly depends on all of its lower layer(s), and can only be used when all layers below it are available to be decoded. Each higher enhancement layer progressively enhances the quality of the decoded media content.

As used in this application, a "chunk" is a unit of data that contains information for a small temporal portion of (e.g., video) content to be decoded and/or played (e.g., on the order of one second of video). The entire content can be decoded and/or played by decoding and/or playing a sequence of chunks.

As used in this application, a "subchunk" is a layer (e.g., a base layer or an enhancement layer) of a chunk.

As used in this application, a "sliding quality window" is a number of chunks (no greater than the number of chunks of content remaining to be decoded and/or played) immediately following a chunk of the content being played.

As used in this application, a "legally allowed buffer size" is an amount (measured in terms of time and/or data) of future (not yet played) content permitted, under an applicable law and/or contract or agreement, to be stored.

§4.2 OVERVIEW

In some example embodiments consistent with the present invention, the property of SVC (note that SVC is not required), which makes every enhancement layer of a video completely directly or indirectly dependent on all its lower layers, is exploited to provide video delivery that can deliver download quality video, while qualifying as a video streaming service. Recall that any amount of enhancement layer data is of no use if the base layer data for the video is unavailable. More specifically, at least some example embodiments consistent with the present invention allow enhancement layers of any number of future chunks of a video to be delivered in advance (like a downloading service), but restricts the delivery of base layers of chunks to a limited set of chunks just about to be viewed (like a streaming service). Such example embodiments allow user client devices to stream the base layer data of the video and download the enhancement layer data. This combination may be referred to as "video streamloading." Like a video streaming service, if the network connection is lost, the video playback aborts in a video streamloading service because the streaming of the base layer stops. Similarly, like regular video streaming, with streamloading, seeking back on the video to replay a portion of it requires the base layer data to be streamed again. In addition, any Digital Rights Management ("DRM") technologies used to protect content in current streaming technologies can also be used with streamloading. This is because of the foregoing properties of a video streamloading service (legally) qualifies it as a video streaming service. Thus, it is expected that content owners would price streamloading services similar to other video streaming services.

FIG. 1 illustrates operations in a system 100 consistent with the present invention. The system 100 includes a stream server 110, a download server 120 and a user client device 130. (Note that although shown separately, functions performed by the stream server 110 and the download server 120 may be performed on a single server.) As shown, the user client device 130 initially fetches future enhancement layer chunks 150, the downloading of which is only restricted by bandwidth constraints. That is, future enhancement layer chunks are requested as soon as the user client device 130 has spare bandwidth available. The user client device then fetches base layer chunks of video 140, for example, based on time constraints. That is, a particular base layer chunk 140 is requested only when the user client device 140 is (contractually and/or legally) allowed to request and/or receive the base layer chunks, based on the current play position of the video (or of other content). When playing the video, the user client device assembles the fetched layers of chunks in order 160, and provides them to the player.

FIGS. 2A-2C compare streaming and streamloading when a user client device moves from a high data rate center of cell to a low data rate cell edge, such as illustrated in FIG. 2A. In FIGS. 2B and 2C, each a subchunk (i.e., each layer of a chunk) is labeled with $t_T$, which denotes the time slot at which it was downloaded. Assume that chunk of the video takes twelve time slots to play. Referring to FIG. 2B, a streaming system is typically constrained to only download the next few chunks. Consequently, with streaming, under the scenario illustrated in FIG. 2A, the video quality drops as the data rate drops as shown in FIG. 2B. Referring now to FIG. 2C, a streamloading system downloads the enhancement layers of all future video chunks before the data rate drops. Consequently, with streamloading, under the scenario illustrated in FIG. 2A, the user client device can maintain good video quality throughout. More specifically, a user client device in a streamloading system can download all future enhancement layer subchunks before the available bandwidth drops, and can therefore sustain high quality video even when it moves far away from the base station. Thus a video streamloading service has the potential to deliver video quality as good as a video downloading service. In fact, the quality of video in an example streamloading service consistent with the present invention is equivalent to that of a streaming service in the worst case, and is equivalent to a downloading service in the best case.

As should be appreciated from the forgoing example, when a streamloading user client device is close to the base station (or access point) and surplus bandwidth is available, such surplus bandwidth is exploited to download enhancement layers of future chunks of the video. When the user client device eventually moves away from the base station (or access point, or otherwise loses available bandwidth, for example due to network congestion), if there is a relatively low bandwidth availability, as long as it is sufficient to sustain the streaming of base layer data, it will be possible to play high quality video (because the enhancement layer data for those chunks had been downloaded previously).

Figure 3:
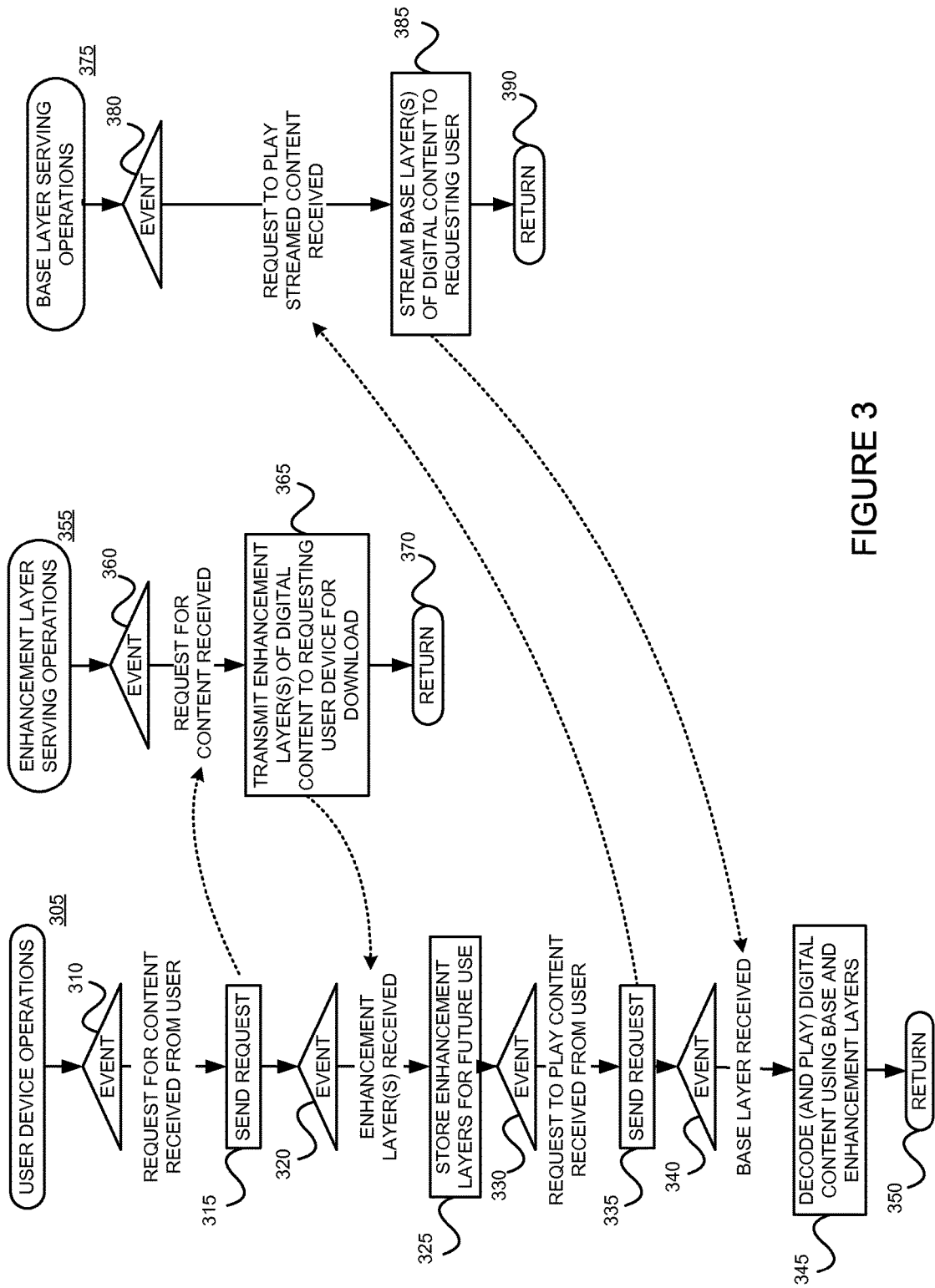

FIG. 3 includes flow diagrams which illustrate example methods 305/355/375 consistent with the present invention performed by a user client device (Recall, e.g., 130 of FIG. 1.) that can request and decode (and perhaps play) digital content, an enhancement layer server (Recall, e.g., 120 of FIG. 1.), and a base layer server (Recall, e.g., 110 of FIG. 1, which may be the same device as, or a different device from, the enhancement layer server.). Collectively, a system-wide method is provided in which a user client device requests enhancement layers of the media content (310 and 315). An enhancement layer serving module receives the request for enhancement layers of the media content (360), and responsive to the received request, serves at least some enhancement layers of the media content to the user client device (365). The user client device receives the enhancement layer(s) of the media content (320) and stores the received enhancement layer(s) of the media content (325). The user client device also requests a base layer of the media content (330 and 335). A base layer serving module receives the request for a base layer of the media content (380) and, responsive to the received request, streams the base layer of the media content to the user client device (385). The client device receives the stream of the base layer of the media content (340). The user client device may then decode the media content using both (1) the stored enhancement layer(s) of the media content and (2) the received stream of the base layer of the media content. (Block 345) The user client device may then play the decoded media content (Block 345).

§4.3 DETAILED EXAMPLE IMPLEMENTATION(S)

In one example implementation of a streamloading system, a video is to be divided into N sequential chunks, $\{c_i | 0 \leq i < N\}$ each containing an equal length of playing time of the video. Each chunk $c_i$ is encoded in M layers, resulting in M subchunks, $\{s_{ij} | 0 \leq j < M\}$ where $s_{i0}$ is the base layer subchunk of chunk $c_i$ and $\{s_{ij} | 0 \leq j < M\}$ are its enhancement layer subchunks. The user client device starts playing chunk $c_i$ as soon as chunk $c_{i-1}$ finishes playing and subchunk $s_{i0}$ has finished downloading. A video interruption takes place if subchunk $s_{i0}$ has not finished downloading by the time chunk $c_{i-1}$ finishes playing. Once a user client device starts playing chunk $c_p$ in any system, only the future subchunks $\{s_{ij} | p < i < N, 0 \leq j < M\}$ may be downloaded.

For a user client device playing chunk $c_p$, a video streaming (not streamloading) service only allows subchunks from $S_p^{stream}$ to be downloaded, where $S_p^{stream} = \{s_{ij} | p < i < (p+b), 0 \leq j < M\}$. In this example, b is the legally and/or contractually allowed buffer size, measured in units of chunks.

In the example streamloading system, when a user client device is playing chunk $c_p$, only subchunks from $S_p^{stream}$ may be downloaded, where:

$$S_p^{stream} = \{s_{i0} | p < i < +b)\} \cup \{s_{ij} | p < i < N, 1 \leq j < M\}.$$

$s_{i0}$ denotes the $i^{th}$ base layer, and $S_{i,j}$ denotes the $j^{th}$ enhancement layer corresponding to the $i^{th}$ base layer. Thus, base layer subchunks are downloaded based on the legally and/or contractually allowed buffer size b, while all future enhancement layer subchunks are allowed to be downloaded.

As defined in §4.1 above, a sliding quality window consists of w>b chunks immediately following chunk $c_p$ being played. It is desirable to continuously optimize the quality of video within the sliding quality window. If $S_p$ denotes the set of all downloadable subchunks when chunk $c_p$ is playing, in streaming and streamloading systems, subchunk $s_{ij} \in S_p$ may be downloaded before subchunk $s_{i'j'} \in S_p$ when any of the following conditions is true:

$i < i' \leq p+w$ and $j=j'$;

$i, i' \leq p+w$ and $j < j'$;

$i \leq p+w < i'$;

$p+w < i=i'$ and $j < j'$; and $p+w < i < i'$.

A "time first" chunk serving strategy is a more conservative strategy that favors uninterrupted play over quality. A "quality first" chunk serving strategy is more aggressive strategy that favors quality over uninterrupted play. By manipulating the size of the quality window (to the extent permitted by law and/or contract), a more or less conservative chunk serving strategy can be used. Thus a conservative "time first" strategy would download all lower layer enhancement layer sub-chunks in a window, before tackling higher layer subchunks in the window (a left to right policy); this typically implies a larger window because the objective is to download as far into the future as possible. An aggressive "quality first" strategy would download all subchunks over a shorter window (an "down-up" policy); again assuming the two schemes are downloading about the same amount subchunks at any given time. Hybrid policies (e.g., downloading more lower layer enhancement layer subchunks, and less and less higher layer subchunks, thereby providing a "diagonal" policy) are also possible.

Thus, while chunk $c_p$ is playing, at first, all downloadable base layer subchunks are requested for download, earlier subchunks being requested first. Downloadable enhancement layer subchunks falling within the quality window are then requested for download, layer by layer, earlier subchunks being requested first within a layer. After all subchunks belonging to the quality window are downloaded, any remaining downloadable subchunks are then requested for download chunk by chunk, lower layer subchunks being requested first within a chunk.

In one example implementation, videos are split into chunks and subchunks, with a chunk length of 1.2 s, and coded into four layers (M=4). In this example, N=5000 for a 100 minute video (60*100/1.2). A quality window size w=50 may be used as an example. Naturally, other values are possible and will depend on the application and conditions.

§4.4 EXAMPLE APPARATUS

Figure 4:
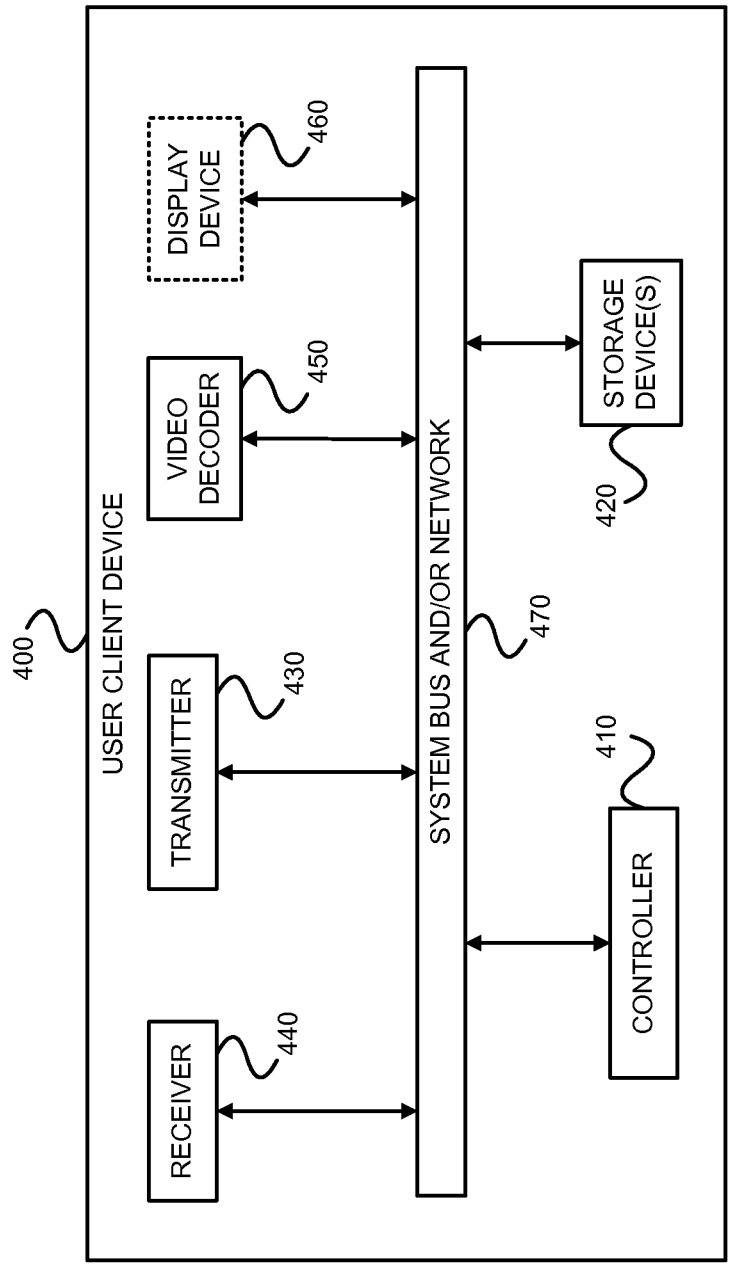
FIG. 4 is a block diagram illustrating an example user client device that can request and decode (and perhaps play) digital content such as layered digital video.

FIG. 4 is a block diagram illustrating an example user client device 400 that can request and decode (and perhaps play) digital content such as layered digital video. Such an example device may include, for example, a desktop computer, a laptop computer, a tablet computer, a smart phone, a set-top box, etc. As shown, the device 400 may include a controller 410, one or more storage devices 420, a transmitter 430, a receiver 440, a video decoder 450, a display device 460 and a system bus(es) and/or network(s) 470. The various components 410-460 may communicate with each other via the system bus(es) and/or network(s) 470. The controller 410 may include a microprocessor, an ASIC, an FPGA, etc., and may control and coordinate operations of the other components 420-460 of the device. The storage device(s) 420 may provide volatile and non-volatile storage of information, and/or program instructions. The transmitter 430 may operate transmit various requests. The receiver 440 may operate to receive one or more layers of video information (to be stored, to be decoded, and/or to be viewed, etc.). Video decoder 450 may decode previously downloaded layers and steamed base layers of received video information to be rendered (e.g., on device). The decoded video may then be rendered on a display device 460. (Audio portions of a video stream may be decoded and rendered on a speaker (not shown).)

Figure 5:
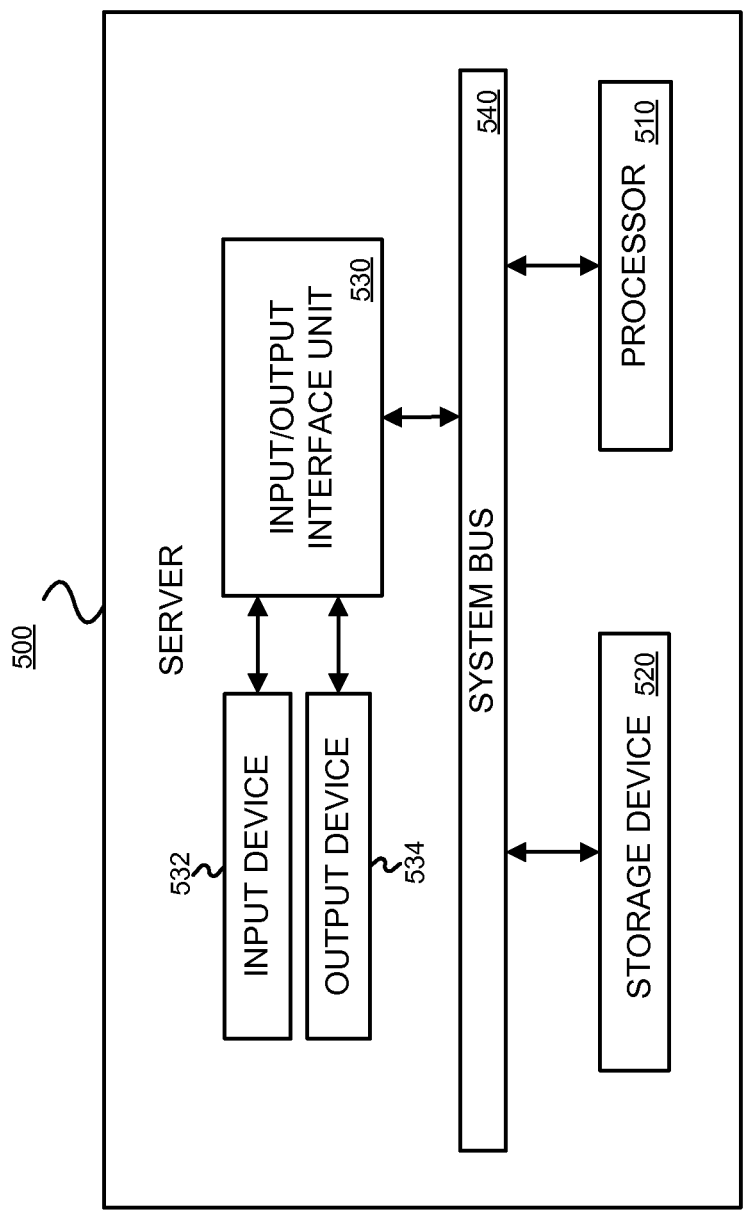
FIG. 5 is a block diagram illustrating an example server (or an example user client device) that may perform various acts or methods, and store various information (e.g., enhancement layer serving for download, or base layer streaming) generated and/or used by such acts or methods, in a manner consistent with the present invention.

FIG. 5 is a block diagram illustrating an example server (or an example user client device) 500 that may perform various acts or methods, and store various information (e.g., enhancement layer serving for download, or base layer streaming) generated and/or used by such acts or methods, in a manner consistent with the present invention. The apparatus 500 may include one or more processors 510, one or more input/output interface units 530, one or more storage devices 520, and one or more system buses and/or networks 540 for facilitating the communication of information among the coupled elements. One or more input devices 532 and one or more output devices 534 may be coupled with the one or more input/output interfaces 530. The one or more processors 510 may execute machine-executable instructions to perform one or more aspects of the present invention. At least a portion of the machine executable instructions may be stored (temporarily or more permanently) on the one or more storage devices 520 and/or may be received from an external source via one or more input interface units 530. In one embodiment, the server may be one or more conventional personal computers. In this case, the processing units 510 may be one or more microprocessors. The bus 540 may include a system bus. The storage devices 520 may include system memory, such as read only memory (ROM) and/or random access memory (RAM). The storage devices 520 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, and solid state storage. A user may enter commands and information into the personal computer through input devices 532, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 510 through an appropriate interface 530 coupled to the system bus 540. The output devices 534 may include a monitor or other type of display device, which may also be connected to the system bus 540 via an appropriate interface. In addition to (or instead of) the monitor, the personal computer may include other output devices (not shown), such as speakers and printers for example. The various methods and acts described above (performed either by a server, or even by a user client device) may be performed by one or more of the illustrated apparatus, and the various information described above may be stored on one or more apparatus. Thus, the modeling and design methods described above may be implemented as processor-executable instructions (for example as software modules) stored on a non-transitory storage device (RAM, ROM, magnetic and/or optical disk storage, solid state storage, etc.). These instructions may be executed by one or more processors (for example, microprocessors). Data and/or instructions used may be received by one or more inputs via one or more input interfaces. Data produced may be output by one or more outputs via one or more output interfaces. Therefore, one or more aspects of the methods described above may be implemented on a personal computer, a laptop computer, a tablet, a personal digital assistant, a server, a smart communications device, a set-top box, etc. Alternatively, or in addition, one or more aspects of the methods described above may be implemented on hardware (for example, integrated circuits, application specific integrated circuits, programmable logic or gate arrays, etc.).

§4.5 SIMULATED PERFORMANCE

To evaluate the performance of streamloading, the detailed implementation of a video streamloading service described in §4.3 above was simulated by the inventors, and its performance was compared with a streaming service. (See, e.g., the paper, A. Rath, S. Goyal and S. Panwar, "Streamloading: Low Cost High Quality Video Streaming for Mobile Users," *ACM 5th Workshop on Mobile Video* (*MoVid*'13), (Oslo, Norway, 27 Feb. 2013, incorporated herein by reference.) In those simulations, the present inventors found that for all kinds of videos, a streamloading system can serve more than 50% additional users with near perfect video quality, as compared to a streaming system, in the presence of 20 femtocells in the macrocell. Even in the absence of femtocells, a streamloading system can serve as much as 35% additional users with near perfect video quality, as compared to a streaming system. These simulations demonstrated that by using streamloading, network operators can increase their network capacity, and content providers can serve a higher number of users with better quality video using the same network resources. Fluctuations in network capacity might cause fluctuations in video quality that negatively affects user perceived quality, especially as the quality of the video deteriorates. The present inventors found that the fluctuations grow as the quality of the video deteriorates. Since a streamloading system was found to serve better quality videos in almost all scenarios simulated and since it smoothes out the video bit rate as the channel quality varies, the perception, as well as the amount, of fluctuation in quality of video is also generally found to be lower in streamloading.

§4.6. ALTERNATIVES AND REFINEMENTS

The example implementations of a streamloading system described can be modified in a variety of ways. For example, the femtocells used in the simulations discussed in the paper, A. Rath, S. Goyal and S. Panwar, "Streamloading: Low Cost High Quality Video Streaming for Mobile Users," *ACM 5th Workshop on Mobile Video* (*MoVid*'13) could easily be replaced by WiFi hotspots if mobile connectivity for a single connection across these two technologies—cellular and WiFi—can be maintained.

Scheduling algorithms dictating the order of enhancement layer subchunks to download, can be provided to improve the quality of video experienced and/or to reduce fluctuations in the quality level of the video. For example, transmission scheduling algorithms in the cellular network targeted at streaming video in particular can help reduce the airtime consumed by streamloading users such that download of enhancement subchunks at higher data rate regions is favored by the scheduler to that in lower data rate regions.

Any encryption or other protection applied to streamed video could be applied to both parts (base layer and enhancement layers) of the video, and the mechanism to delete the video stream after viewing could also proceed in the same manner as in normal streaming. Alternatively, encryption or other protection could be applied to just the base layer, since the base layer is more crucial than the enhancement layers. Since only the base layer is being streamed, the demands on network bandwidth are reduced, thereby reducing the likelihood of a disruption during streaming. This also lowers bandwidth costs to the consumer, or to the service provider in case of flat rate pricing of bandwidth. (Some combination of both is also possible.)

Other video encoding streams, such as MPEG 4 for example (See, e.g., the article, Marpe, D., Wiegand, T.; Sullivan, G. J., "The H.264/MPEG4 advanced video coding standard and its applications," *IEEE Communications Magazine*, Volume 44, Issue 8, pp. 134-143 (August 2006), incorporated herein by reference.), have a structure that allow for a similar approach. For example, in the context of MPEG 4, B and P frames can be downloaded (like enhancement layers), and I frames can be streamed (like base layers). Given the dependency of B and P frames on I frames, only a very poor video, of no commercial use, can at best be recovered from B and P frames alone.

Although the example streamloading systems and methods were discussed in the context of a wireless network, the streamloading methods can also be used in wireline networks such as cable networks (or any Internet service provider ("ISP"), such as satellite TV for example). For example, in one such alternative system, a set top box (or even a computer, or TV) could pre-download enhancement layers, so that a video on demand can be streamed (only the base layer) to the user later using a lower bandwidth. This allows the ISP to reduce bandwidth usage during peak viewing hours, reducing tremendously the expense in capital expenditure for network infrastructure.

Finally, although the example streamloading systems and methods were described in the context of video content, they can also be modified for use with other media stream coding formats that can be similarly segmented.

§4.7. CONCLUSIONS

As can be appreciated from the foregoing, example systems and methods consistent with the present invention enable the provision of low cost streaming video, while reducing the amount of consistent bandwidth needed to consume media content.

In at least some of the example streamloading implementations, only those parts of the digital representation of the content that add to the quality, but cannot be used, by themselves, to reproduce the content are downloaded. An example of this are the higher layers of SVC (Scalable Video Coding, H.264) video (the enhancement layers) that are useless without the base layer bit stream, and serve to add quality to a video stream beyond that offered by the base layer alone. In an implementation of SVC video using streamloading, the enhancement layers could be downloaded before viewing. This could be done when bandwidth is abundant and/or inexpensive (e.g., in a Wi-Fi hotspot, by an Ethernet connection, or close to a cellular base station, where high bandwidth is available). Later, it would only be the base layer that would be streamed in the traditional manner. Combining the previously downloaded enhancement layers with the incoming base layer stream would lead to a high quality video viewing experience even at bandwidths that support streaming only the base layers.

Thus, wireless networks with highly variable data rates can provide a streamloading video delivery service that improves the quality of the video watched by mobile users, while still (legally) qualifying as a video streaming service generally offered at cheaper video streaming service prices. The quality of video enjoyed by users in streamloading, in the worst case scenario, is no worse than that in streaming, while in the best case scenario, it can be as good as that in downloading. Since steamloading video delivery can also be used to improve the capacity of a macrocell, it benefits network operators as well as video delivery service providers.

What is claimed is:

1. A computer-implemented method for playing media content which is divided into a sequence of temporal chunks, each chunk including a base layer subchunk and at least two enhancement layer subchunks, the computer-implemented method comprising:
   a) requesting, by a client device, (1) at least one enhancement layer subchunk of at least one chunk of the media content and (2) at least one base layer subchunk of the media content;
   b) receiving, by the client device the at least one enhancement subchunk of the at least one chunk of the media content and the at least one base layer subchunk of the media content;
   c) decoding, by the client device, the media content using both (1) at least one enhancement layer subchunk of the at least one chunk of the media content and (2) the at least one base layer subchunk of the media content; and
   d) playing, by the client device, the decoded media content,
   wherein the act of requesting at least one enhancement layer subchunk of at least one chunk of the media content is performed in accordance with a sliding quality window, and
   wherein while a $p^{th}$ chunk $c_p$ is playing, the computer-implemented method (1) first requests all base layer subchunks after the $p^{th}$ chunk but before the $(p+b)^{th}$ chunk, where b is defined as a buffer size, with earlier chunks being requested first, and (2) then requests enhancement layer subchunks after the $p^{th}$ chunk, falling within the sliding quality window, layer by layer, where earlier subchunks within a layer are requested before later subchunks within the layer, whereby a size of the sliding quality window affects whether (A) a conservative, time first, request strategy, which favors uninterrupted play over quality, (B) an aggressive, quality first, request strategy, which favors quality over uninterrupted play, or (C) a diagonal strategy, is used.

2. The computer-implemented method of claim 1 wherein each of the temporal chunks encodes approximately one second of the media content.

3. The computer-implemented method of claim 1 wherein the buffer size (b) is determined based on statutory law or by legal contract.

4. The computer-implemented method of claim 1 wherein the acts of requesting at least one enhancement layer subchunk of at least one chunk of the media content, and requesting at least one base layer subchunk of the media content are performed such that a download of higher enhancement layer subchunks in a higher data region is favored over a download of higher enhancement layer subchunks in a lower data region.

5. The computer-implemented method of claim 1 wherein the acts of requesting at least one enhancement layer subchunk of at least one chunk of the media content, and requesting at least one base layer subchunk of the media content, are performed in a way to reduce fluctuations in a quality level of the video.

6. A computer-implemented method for providing media content which is divided into a sequence of temporal chunks, each chunk including a base layer subchunk and at least two enhancement layer subchunks, to a client device, the computer-implemented method comprising:
   a) receiving, by a content serving system, a request, sourced from a client device, for at least one enhancement layer subchunk of at least one chunk of the media content;
   b) receiving, by the content serving system, a request, sourced from the client device, for at least one base layer subchunk of the media content; and
   c) transmitting, by the content serving system, (1) the requested at least one enhancement layer subchunk of at least one chunk, and (2) the requested at least one base layer subchunk, to the client device,
   wherein the received request for the at least one enhancement layer subchunk of the at least one chunk of the media content was performed in accordance with a sliding quality window, and
   wherein while a $p^{th}$ chunk $c_p$ is playing, the computer-implemented method (1) first provides all base layer subchunks after the $p^{th}$ chunk but before the $(p+b)^{th}$ chunk, where b is defined as a buffer size, with earlier chunks being requested first, and (2) then provides enhancement layer subchunks after the $p^{th}$ chunk, falling within the sliding quality window, layer by layer, where earlier subchunks within a layer are requested before later subchunks within the layer, whereby a size of the sliding quality window affects whether (A) a conservative, time first, request strategy, which favors uninterrupted play over quality, (B) an aggressive, quality first, request strategy, which favors quality over uninterrupted play, or (C) a diagonal strategy, is used.

7. The computer-implemented method of claim 6 wherein each of the temporal chunks encodes approximately one second of the media content.

8. The computer-implemented method of claim 6 wherein the acts of transmitting at least two enhancement layer subchunks of at least one chunk of the media content, and transmitting at least one base layer subchunk of the media content are performed such that a download of higher enhancement layer subchunks in a higher data region is favored over a download of higher enhancement layer subchunks in a lower data region.

9. The computer-implemented method of claim 6 wherein the acts of transmitting at least one enhancement layer subchunk of at least one chunk of the media content, and transmitting at least one base layer subchunk of the media content are performed in a way to reduce fluctuations in a quality level of the video.

10. A client device for decoding media which is divided into a sequence of temporal chunks, each chunk including the base layer subchunk and at least two enhancement layer subchunks, the client device comprising:
   a) at least one microprocessor, application specific integrated circuit, or field programmable gate array; and
   b) a storage device storing processor executable instructions which, when executed by the at least one microprocessor, application specific integrated circuit, or field programmable gate array, cause the at least one microprocessor, application specific integrated circuit, or field programmable gate array to
      1) request (i) at least one enhancement layer subchunk of at least one chunk of the media content and (ii) at least one base layer subchunk of the media content;

2) receive (i) the requested at least one enhancement layer subchunk of at least one chunk of the media content and (ii) the requested at least one base layer subchunk of the media content;
3) decode the media content using both (i) the received at least one enhancement layer subchunk of at least one chunk of the media content and (ii) the received at least one base layer subchunk of the media content; and
4) play the decoded media content,
wherein the act of requesting at least one enhancement layer subchunk of at least one chunk of the media content is performed in accordance with a sliding quality window, and
wherein while a $p^{th}$ chunk $c_p$ is playing, the client device (1) first requests all base layer subchunks after the $p^{th}$ chunk but before the $(p+b)^{th}$ chunk, where b is defined as a buffer size, with earlier chunks being requested first, and (2) then requests enhancement layer subchunks after the $p^{th}$ chunk, falling within the sliding quality window, layer by layer, where earlier subchunks within a layer are requested before later subchunks within the layer, whereby a size of the sliding quality window affects whether (A) a conservative, time first, request strategy, which favors uninterrupted play over quality, (B) an aggressive, quality first, request strategy, which favors quality over uninterrupted play, or (C) a diagonal strategy, is used.

11. The client device of claim 10 wherein each of the temporal chunks encodes approximately one second of the media content.

12. The client device of claim 10
wherein the buffer size (b) is determined based on statutory law or by legal contract.

13. At least one server for providing media content which is divided into a sequence of temporal chunks, each chunk including a base layer subchunk and at least two enhancement layer subchunks, the server comprising:

a) at least one microprocessor; and
b) a storage device storing microprocessor executable instructions which, when executed by the at least one microprocessor, cause the at least one microprocessor to
1) receive, by a content serving system, a request, sourced from a client device, for at least one enhancement layer subchunk of at least one chunk of the media content;
2) receive, by the content serving system, a request, sourced from the client device, for at least one base layer subchunk of the media content; and
3) transmit, by the content serving system (i) the requested at least one enhancement layer subchunk of at least one chunk, and (ii) the requested at least one base layer subchunk, to the client device,
wherein the received request for the at least one enhancement layer subchunk of the media content was performed in accordance with a sliding quality window, and
wherein while a $p^{th}$ chunk $c_p$ is playing, the at least one server (1) first provides all base layer subchunks after the $p^{th}$ chunk but before the $(p+b)^{th}$ chunk, where b is defined as a buffer size, with earlier chunks being requested first, and (2) then provides enhancement layer subchunks after the $p^{th}$ chunk, falling within the sliding quality window, layer by layer, where earlier subchunks within a layer are requested before later subchunks within the layer, whereby a size of the sliding quality window affects whether (A) a conservative, time first, request strategy, which favors uninterrupted play over quality, (B) an aggressive, quality first, request strategy, which favors quality over uninterrupted play, or (C) a diagonal strategy is used.

14. The at least one server of claim 13 wherein each of the temporal chunks encodes approximately one second of the media content.

* * * * *